United States Patent [19]
Sinke

[11] Patent Number: 6,146,080
[45] Date of Patent: Nov. 14, 2000

[54] APPARATUS FOR UNLOADING SAND, GRAVEL, TOP-SOIL OR OTHER AGGREGATE MATERIAL

[75] Inventor: Robert Sinke, St. Catherines, Canada

[73] Assignee: Can-American Stone Spreader Inc., St. Catherines, Canada

[21] Appl. No.: 09/138,777

[22] Filed: Aug. 24, 1998

[51] Int. Cl.[7] .................................................... B60P 1/36
[52] U.S. Cl. ............................................................ 414/519
[58] Field of Search .................................. 414/519, 520; 298/27, 28

[56] References Cited

U.S. PATENT DOCUMENTS

| | | | |
|---|---|---|---|
| 2,412,121 | 12/1946 | Bradshaw | 414/520 |
| 2,466,923 | 4/1949 | Woodard | 414/519 |
| 2,511,246 | 6/1950 | Chamberlin | 414/519 X |
| 3,356,270 | 12/1967 | Heider | 414/520 X |
| 3,735,904 | 5/1973 | Vissers | 414/519 X |
| 3,811,602 | 5/1974 | Holland . | |
| 4,630,988 | 12/1986 | LaRue . | |
| 4,923,358 | 5/1990 | Van Mill | 414/519 |
| 5,470,186 | 11/1995 | Kwok | 414/519 X |
| 5,658,116 | 8/1997 | Krull | 414/520 X |

FOREIGN PATENT DOCUMENTS

| | | | |
|---|---|---|---|
| 2408535 | 7/1979 | France | 414/519 |
| 667057 | 2/1952 | United Kingdom | 414/519 |

*Primary Examiner*—James W. Keenan
*Attorney, Agent, or Firm*—Gowling Lafleur Henderson

[57] ABSTRACT

An aggregate carrying body has an output area defined at its bottom, a metering beam located above this output area, that can be elevated (and lowered), this metering beam to control and assist the flow of aggregate material to the output area. In the preferred embodiment of this invention, the output area comprises a conveying floor. A conveyor is disposed at the bottom of body and extends beyond the rear of the body through a transverse opening in the rear end wall of the body. Aggregate material in the body flows to the output area and the conveyor is then operable to remove the aggregate material from the body rearwardly and through a transverse opening at the rear of the body.

7 Claims, 9 Drawing Sheets

APPARATUS FOR UNLOADING SAND, GRAVEL, TOP-SOIL OR OTHER AGGREGATE MATERIAL

FIELD OF INVENTION

The invention concerns an apparatus for unloading sand, gravel, top-soil or other aggregate material from an aggregate carrying body, and is particularly concerned with an apparatus having a metering beam to control and assist the flow of aggregate material.

BACKGROUND OF INVENTION

Aggregate material, such as sand, gravel or top-soil, is often loaded at a first location, trucked from the first location to a second location, and unloaded at the second location.

In known devices, an aggregate carrying body is mounted on a truck. The body has sloping sides that lead to an opening at the bottom of the body. A first conveyor below the opening carries aggregate that falls through the opening to an unloading device, such as a second conveyor running at high speed.

In known devices, slidable gates are mounted between the opening at the bottom of the body and the first conveyor. The gates are moved from an open position to a closed position by means such as a hydraulic ram mounted between the gate and the body. In closed position, the gate covers the opening and the aggregate cannot fall from the body to the first conveyor for unloading. In open position, the opening is not covered, and the aggregate can fall or flow from the body through the opening to the first conveyor below.

In a known unloading device, a series of four gates are positioned along the length of the opening. These gates can be opened or closed individually to help control the rate of flow of aggregate material from the body through the opening and onto the first conveyor. For example, if a higher rate of flow is desired, all four gates will be opened. If a slower rate of flow is desired, one or more of the gates will be closed. When the truck is moved from a first to a second location, all gates are closed.

These known systems have a number of disadvantages. First, aggregate material that clumps, such as top-soil, may not flow easily through the opening. Second, the mechanism for opening and closing the gates is moderately complex, thus increasing both the initial cost of the unloading device and the cost of ongoing maintenance and repair. Finally, positioning the gates between the aggregate carrying body and the first conveyor requires that the aggregate carrying body be raised and mounted higher off the ground than if there were no gates. Mounting the body higher off the ground results in a higher center of gravity (and hence instability of the loaded truck) or reduces the carrying capacity of the aggregate carrying body.

SUMMARY OF INVENTION

An object of the present invention is to provide an apparatus for unloading aggregate material from an aggregate carrying body.

An advantage of the present invention is that it facilitates unloading of aggregate material prone to clumping.

A further advantage of the present invention is that it is cheaper and simpler than some known devices for unloading aggregate material.

Yet another advantage of the present invention is that is permits the aggregate carrying body to be mounted closer to the ground than is permitted with some known unloading devices.

According to one aspect of this invention, there is provided an apparatus for carrying and unloading aggregate material comprising: an aggregate carrying body defining an output area proximate a bottom of the body; a metering beam located in the body above the output area; and means for elevating the metering beam from a first position proximate the output area, to a second position away from the output area.

According to another aspect of this invention, there is provided an apparatus for carrying and unloading aggregate material comprising: an aggregate carrying body having a front end wall, a rear end wall, and defining an output area at a bottom of the body wherein the output area comprises a conveying floor; a metering beam located in the body above the output area, the metering beam comprising a first end having a skeg, a tapered second end having an extending longitudinal plate, a pair of downwardly and outwardly extending sides, and a central vertical vane from which the downwardly and outwardly extending sides extend; means for elevating the metering beam from a first position proximate the output area, to a second position away from the output area; the means comprising a hydraulic cylinder attached proximate a top edge of the front end wall of the body, the hydraulic cylinder acting on a cable attached at a first end of the cable proximate the first end of the metering beam and at a second end of the cable to the body, and including a hinge attaching the extending longitudinal plate proximate a top edge of the rear end wall of the body.

BRIEF DESCRIPTION OF THE DRAWINGS

In the drawings, which illustrates example embodiments of the invention.

DETAILED DESCRIPTION OF THE PREFERRED EMBODIMENTS

An aggregate carrying body mounted on a truck is herein described. The aggregate carrying body has a metering beam positioned within it to control and assist the flow of aggregate material to an output area defined at the bottom of the body which removes the aggregate material from the body.

Figure 1:
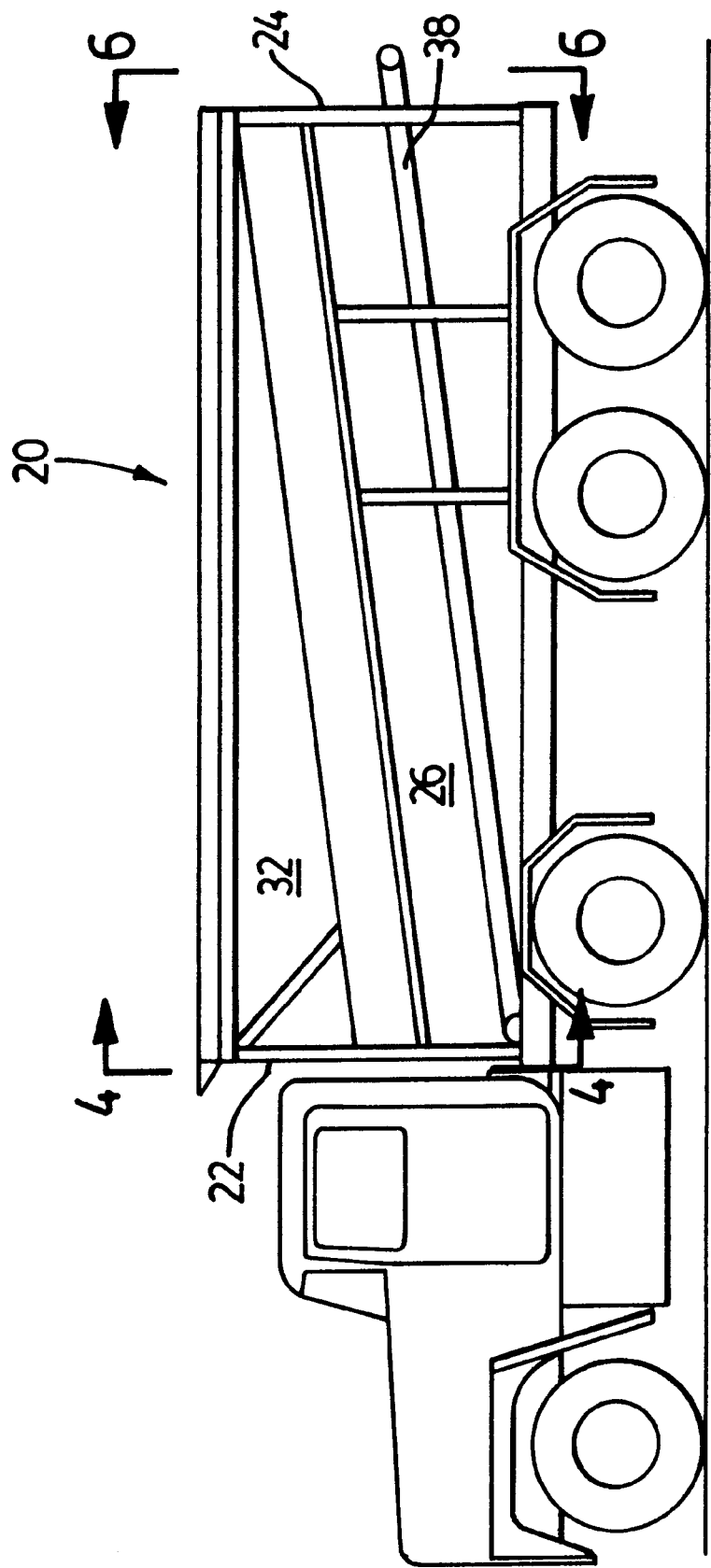
FIG. 1 is a schematic side view of an aggregate carrying body made in accordance with this invention mounted on a truck.
Figure 2:
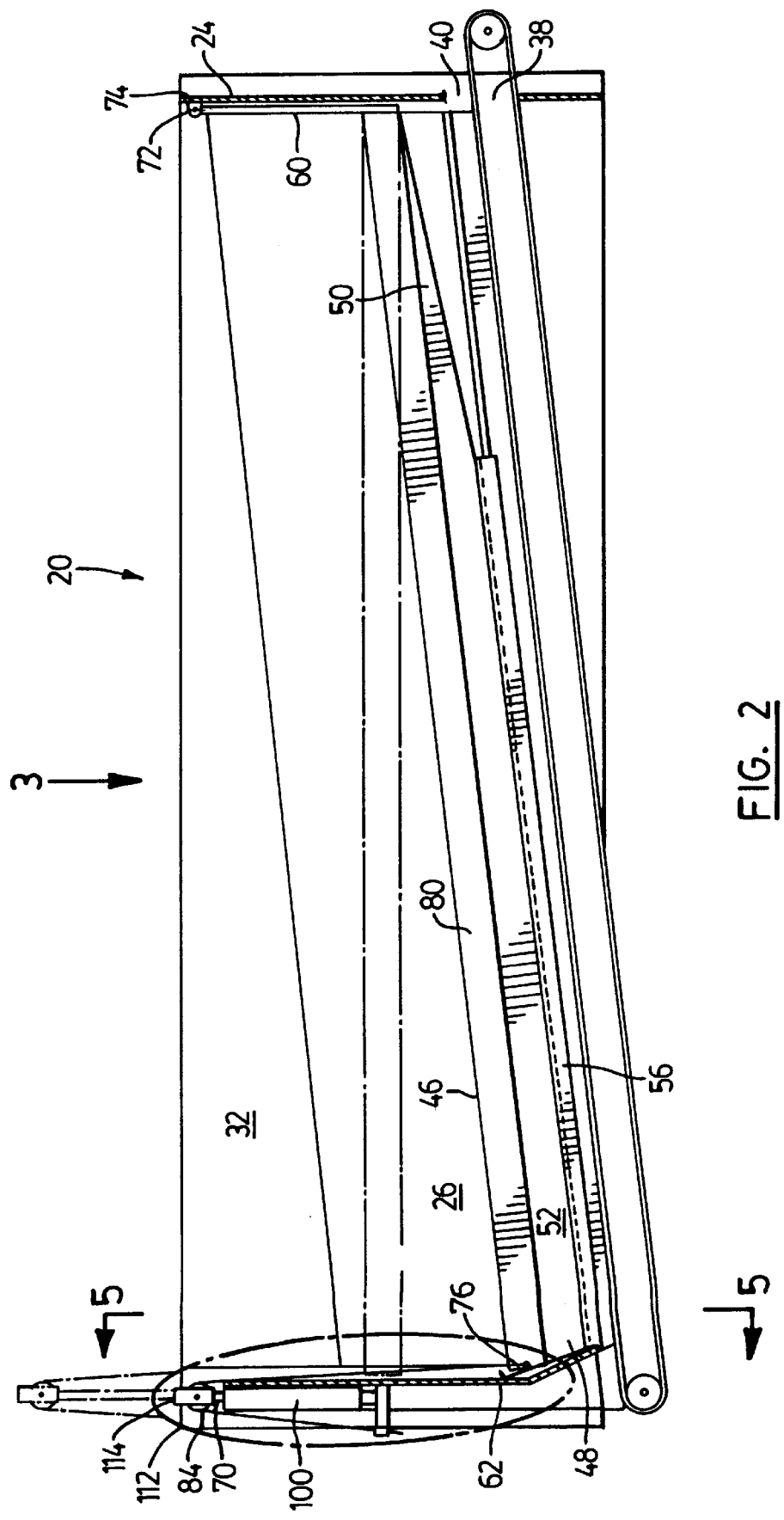
FIG. 2 is a sectional view of the aggregate carrying body taken on section line 2—2 of FIG. 3.
Figure 3:
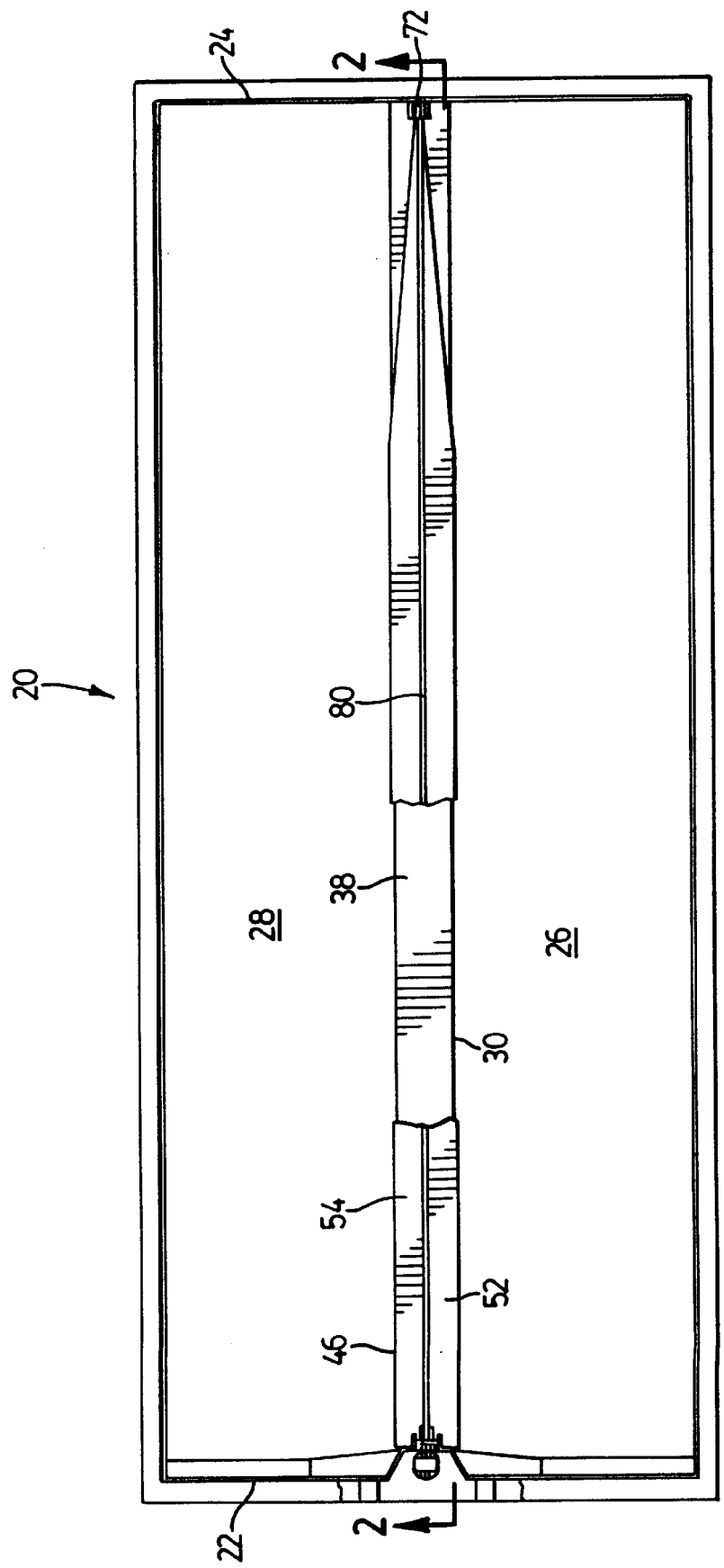
FIG. 3 is a plan view of the aggregate carrying body.

Referring to FIGS. 1, 2, and 3, an aggregate carrying body 20 has a vertical front end wall 22, a vertical rear end wall 24 and a pair of opposing side walls 26 and 28 converging downwardly and inwardly to define a longitudinal output area 30 at the bottom of the body 20. The side walls 26 and 28 taper toward rear end wall 24 such that body 20 is deeper proximate front end wall 22.

Figure 5:
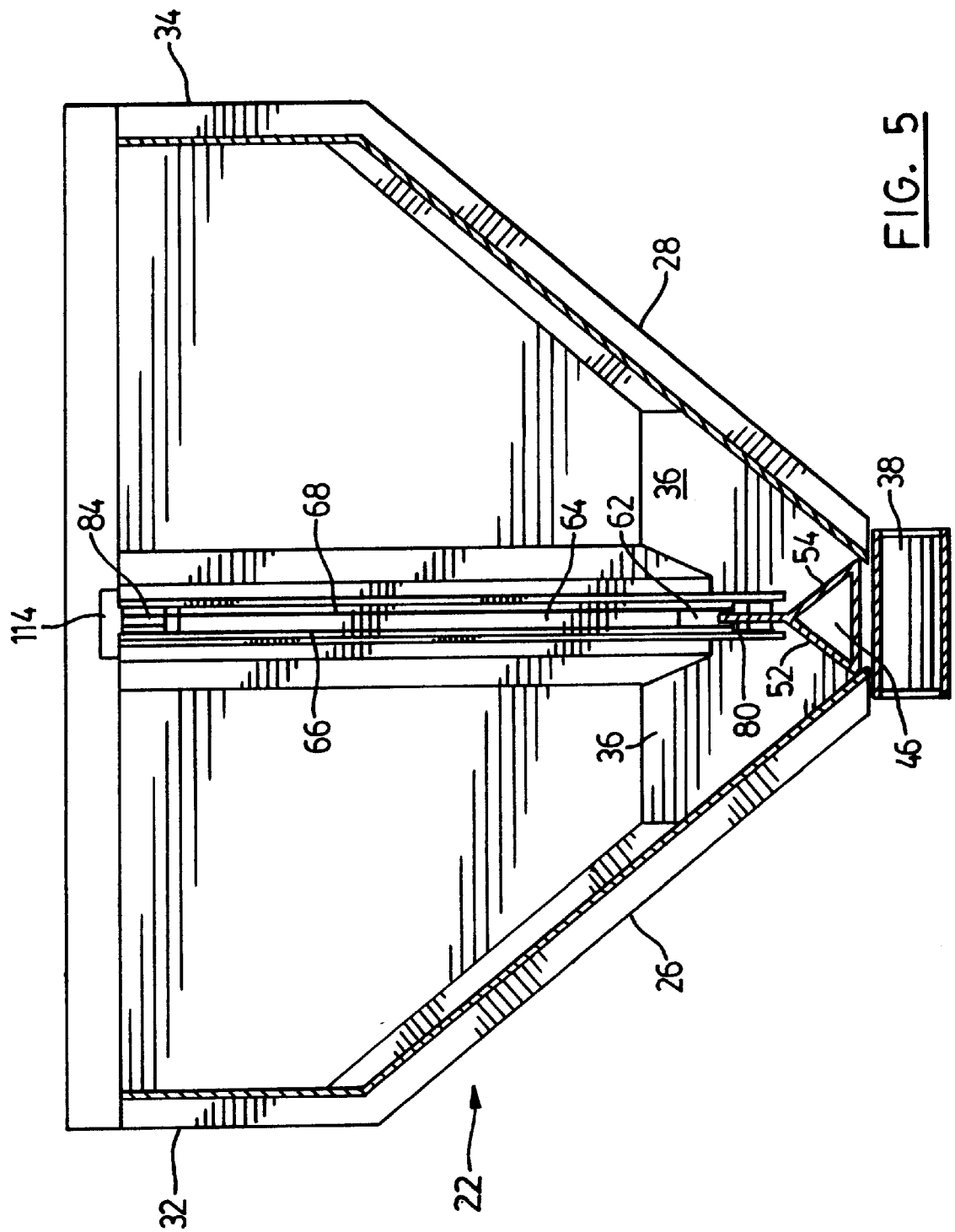
FIG. 5 is a view of the inside surface of the front end wall of the aggregate carrying body.
Figure 9:
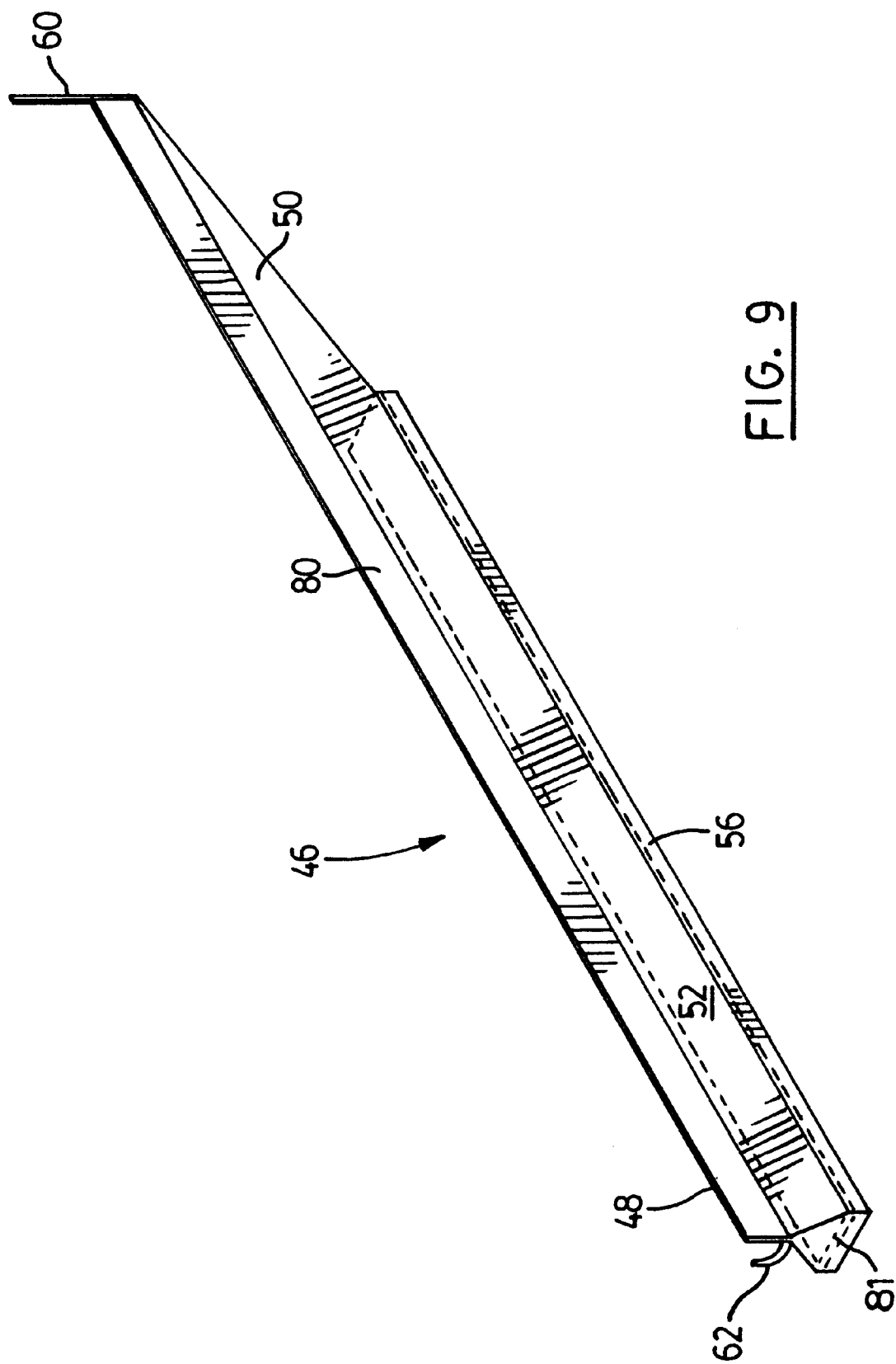
FIG. 9 is an isolated perspective view of the metering beam.

Body 20 is further defined by a pair of opposing vertical side walls 32 and 34 which extend upwardly from the top of the opposing side walls 26 and 28 and taper toward the vertical rear end wall 24 such that the top edge of body 20 is level. As shown in FIGS. 5 and 9, body 20 is also further defined by a oblique front end wall 36 which extends downwardly and inwardly from the bottom of the vertical front end wall 22 to one end of the output area 30.

In the preferred embodiment of this invention, the longitudinal output area 30 comprises a conveying floor. A conveyor 38 is disposed at the bottom of body 20 and extends beyond the rear of the aggregate carrying body 20 through a transverse opening 40 in rear end wall 24 (see FIG. 6). Aggregate material in body 20 flows to the longitudinal output area 30 and conveyor 38 is then operable to remove the aggregate material from body 20 rearwardly and through the transverse opening 40 at the rear of body 20.

Figure 6:
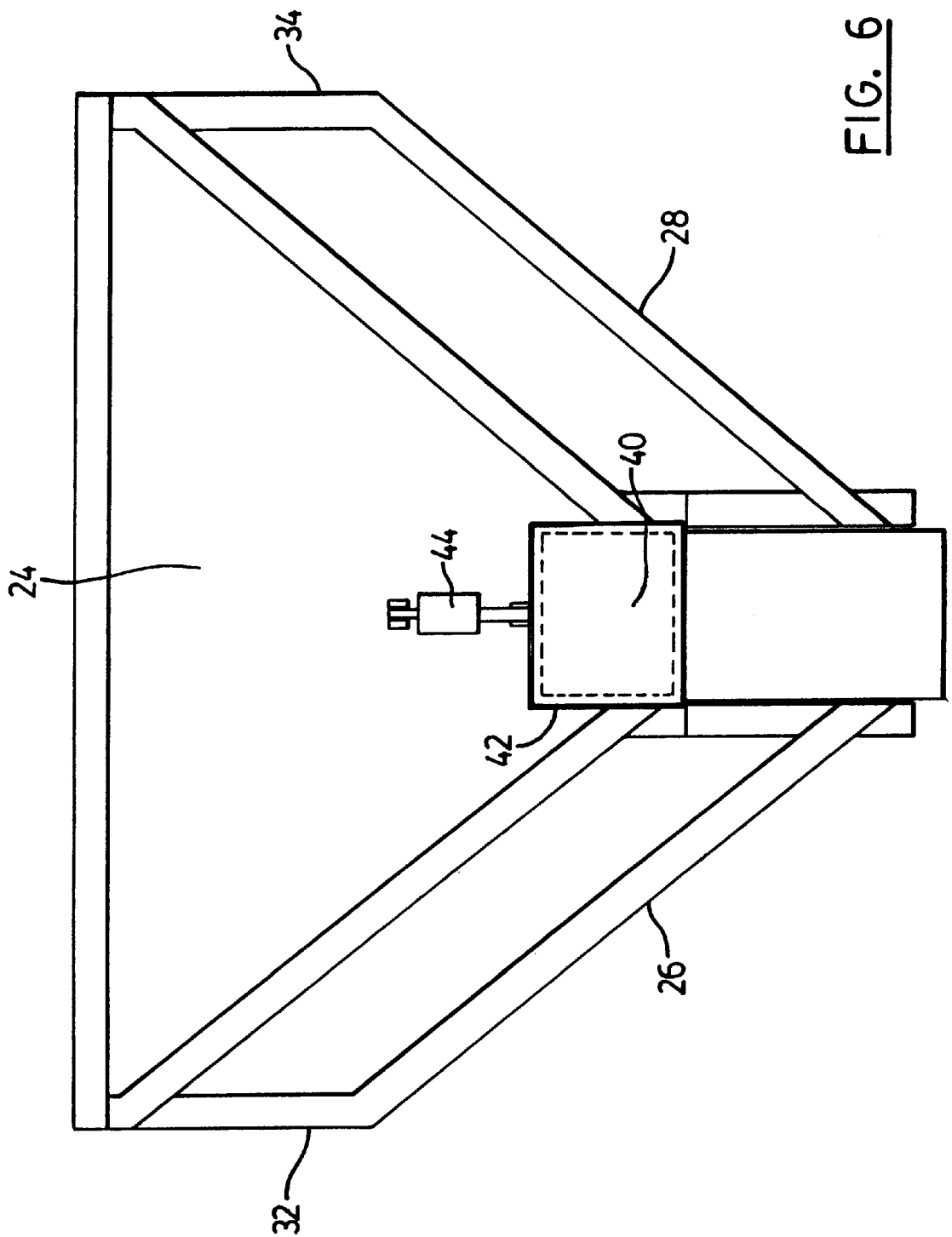
FIG. 6 is a view of the outside surface of the rear end wall of the aggregate carrying body.

As shown in FIG. 6, a gate 42 is located adjacent the outside surface of vertical rear end wall 24. Gate 42 is vertically adjustable by a hydraulic ram 44 to control the size of the transverse opening 40 and thereby control the amount of aggregate material carried out of body 20 by conveyor 38; the gate also prevents loss of aggregate material from the body 20 when transported from a first location to a second location. In the preferred embodiment, conveyor 38 deposits the aggregate material onto a second high speed conveyor (not shown) for unloading.

As shown in FIGS. 2 and 3, a metering beam 46 is positioned in body 20 above the longitudinal output area 30. As shown in FIG. 9, the metering beam 46 has a front end 48, a tapered rear end 50 and a pair of downwardly and outwardly diverging longitudinal side walls 52 and 54 joined together at a vertical longitudinally extending vane 80. Side walls 52 and 54 of metering beam 46 have vertical downwardly extending edges 56 and 58 respectively. The tapered rear end 50 of the metering beam 46 has an upwardly extending longitudinal plate 60. The front end 48 of the metering beam 46 has a skeg 62 welded thereto proximate vane 80. The metering beam further comprises a reinforcing strut 81 extending along the length of the metering beam.

In the preferred embodiment of this invention, metering beam 46 is 19 feet long and the distance between the downwardly extending edges 56 and 58 is 14 inches; vane 80 is ½ inch thick and 6 inches tall; and the reinforcing strut 81 consists of a steel plate approximately ⅔ of the length of metering beam 46 (beginning at front end 48) and positioned approximately 1 inch up the downwardly extending edges 56 and 58, thus defining a "bottom" for metering beam 46.

Figure 7:
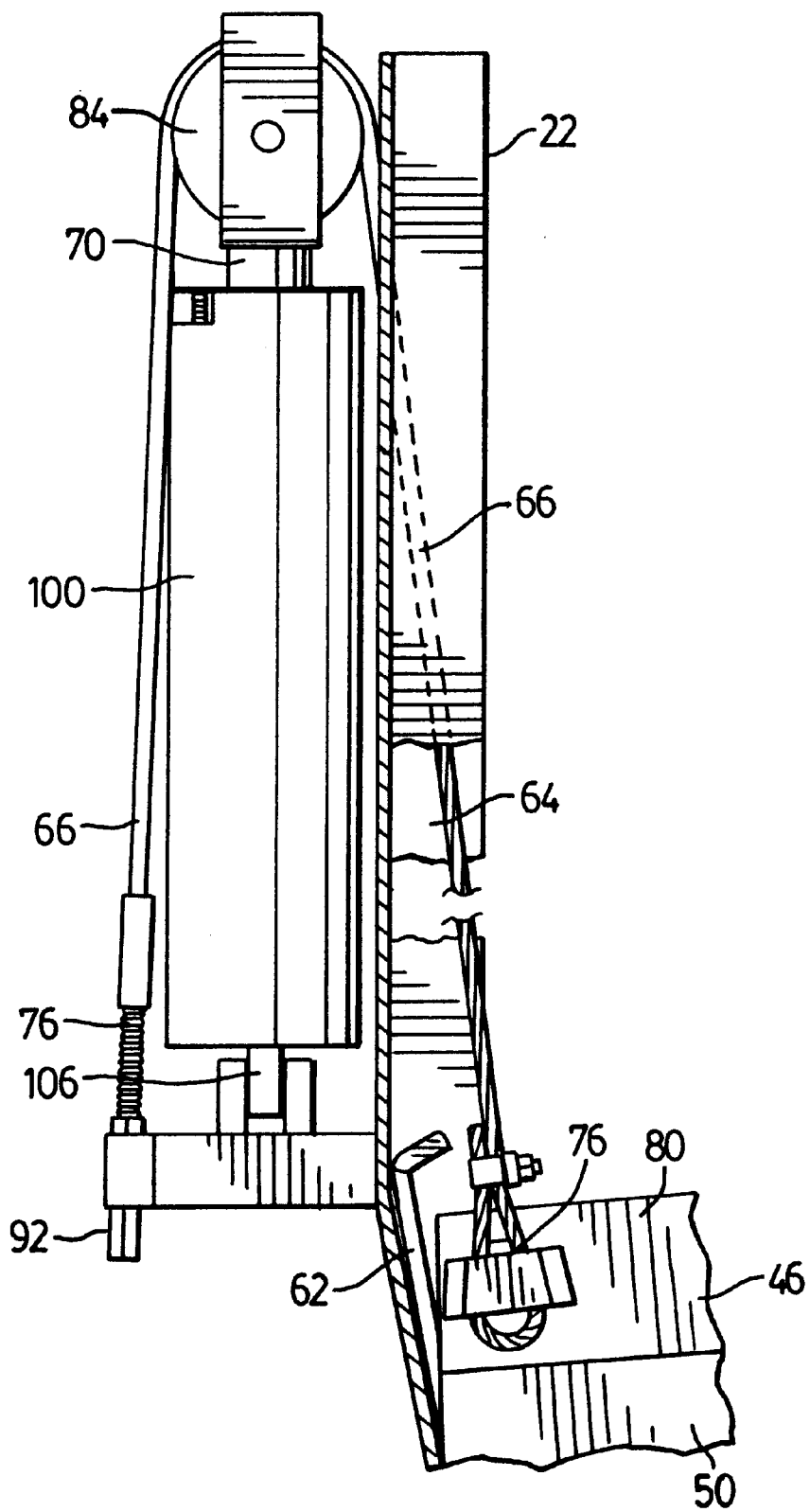
FIG. 7 is an enlarged sectional view of the front end wall of the aggregate carrying body.

As shown in FIGS. 5 and 7, skeg 62 fits into and runs along a skeg guide track 64 located upon vertical front end wall 22 and oblique front end wall 36. Means are provided for elevating (and lowering) the metering beam 46 in the body 20 to control and assist the flow of aggregate material to the longitudinal output area 30. In the preferred embodiment of the invention, the means for elevation comprises cables 66 and 68 attached to the front end 48 of metering beam 46, and operatively associated with a single-acting hydraulic cylinder 100 in conjunction with a hinge 72 (FIG. 2) at the rear end 50 of metering beam 46.

Figure 4:
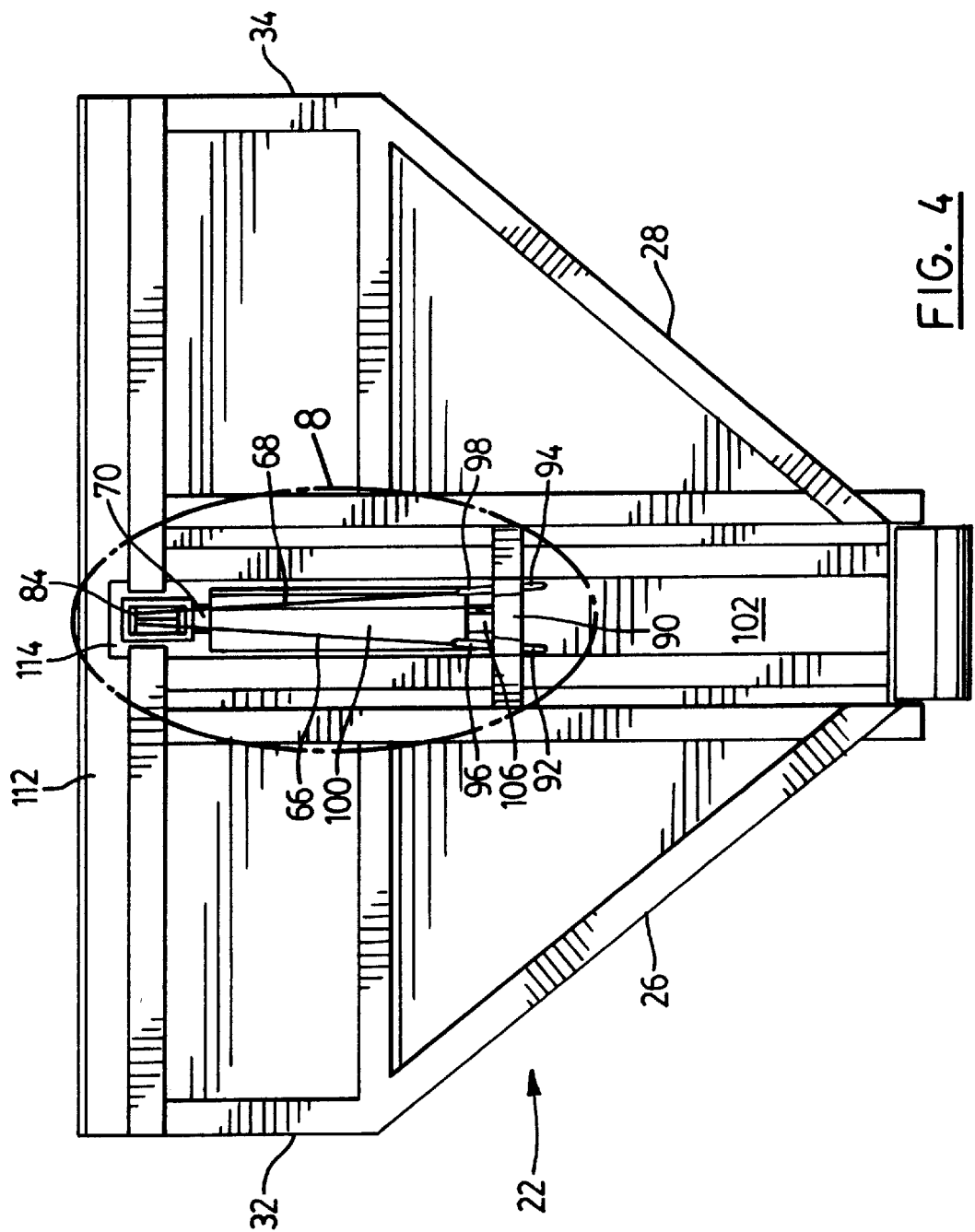
FIG. 4 is a view of the outside surface of the front end wall of the aggregate carrying body.
Figure 8:
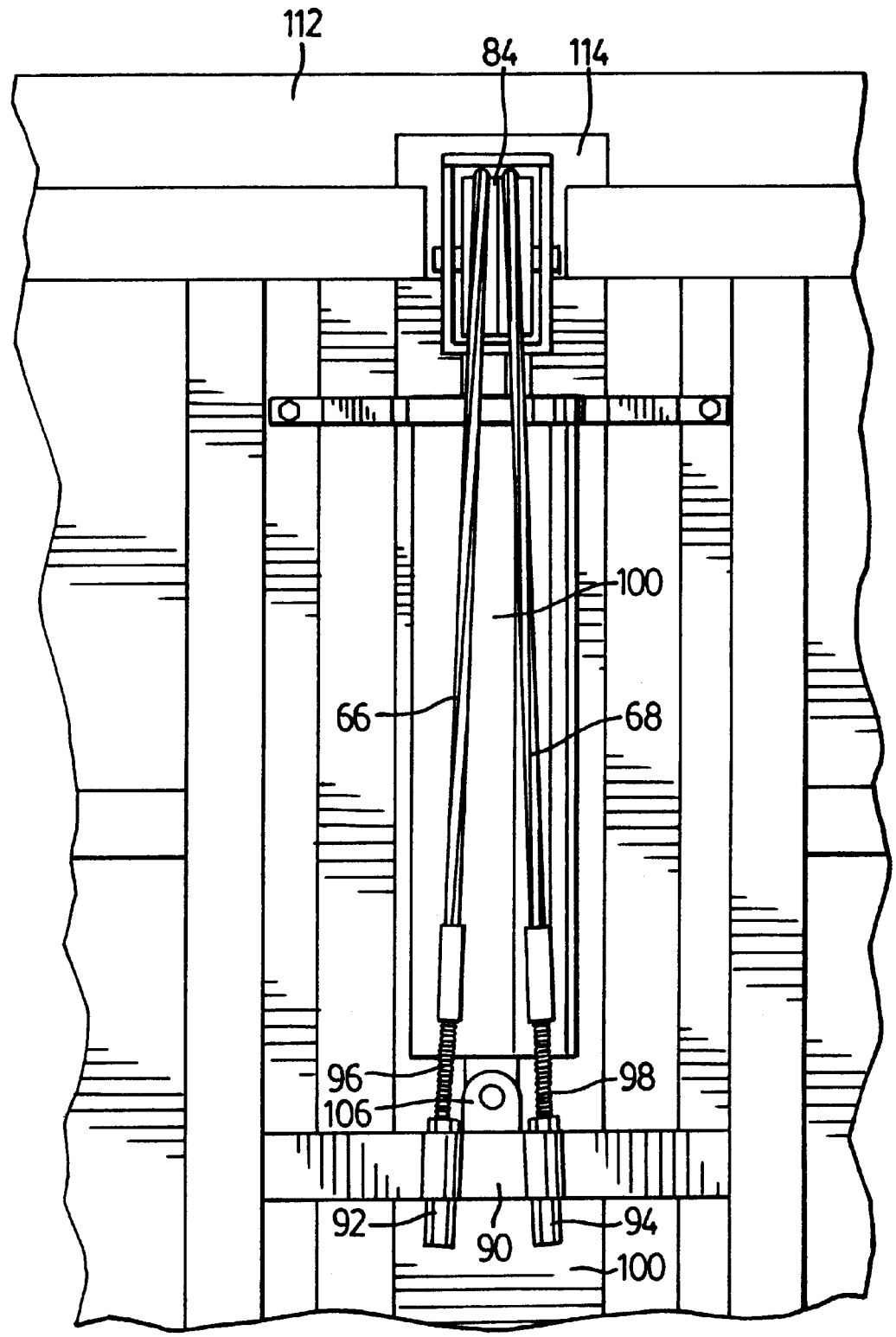
FIG. 8 is an enlarged view of the outside surface of the front end wall of the aggregate carrying body.

As shown in FIGS. 2 and 3, the longitudinal plate 60 of metering beam 46 is pivotally mounted proximate top edge 74 of vertical rear end wall 24 by hinge 72. Returning to FIGS. 5 and 7, cables 66 and 68 are attached at one end to front end 48 of metering beam 46 at the longitudinal vane 80 by cable holders 76, as shown in FIG. 7. As shown in FIGS. 7 and 8, cables 66 and 68 extend upwardly from metering beam 46, over and around a pulley 84 which is mounted on the hydraulic piston 70 of cylinder 100, and are attached at their other end to the outside surface of vertical front end wall 22. More particularly, as shown in FIGS. 4 and 8, cables 66 and 68 terminate in threaded cable adjustors 96 and 98 which receive bolts 92 and 94 extending through bracket 90 of end wall 22. Nuts 96 and 98 can be rotated to take up slack in cables 66 and 68 caused by stretching of cables 66 and 68, thereby adjusting the length of cables 66 and 68 to ensure proper elevation (and lowering) of the metering beam 46.

Hydraulic cylinder 100 is received in an indentation 102 in the outside surface of vertical front end wall 22. The hydraulic cylinder 100 is attached to front end wall 22 by a cylinder mounting pin 106 attached to bracket 90 on front end wall 22.

As shown in FIGS. 2 and 3, vertical front end wall 22 defines at its top edge 112 an aperture 114. In its extended position, the hydraulic piston 70 lifts pulley 84 through the aperture 114. The pulley acts on cables 66 and 68 and, as a result, metering beam 46 is elevated in body 20. As the hydraulic piston 70 is retracted, the metering beam 46 is lowered by the force of gravity acting upon it. Since the retraction of the hydraulic piston 70 may be controlled, the lowering of the metering beam 46 may also be controlled.

As a result of the hinge 72 which pivotally mounts the longitudinal plate 60 of the tapered rear end 50 of metering beam 46 to the proximate top edge 74 of the vertical rear end wall 24, the front end 48 of the metering beam 46 defines an arc-shaped path as it is elevated. Consequently, as the front end 48 is elevated and skeg 62 slides up the front end wall 22 along the skeg guide track 64, skeg 62 tends to pull away somewhat from the front end wall 22. However, the skeg 62 remains in the skeg guide track 64 at all times as the depth of the guide track 64 accommodates this "pulling away" of the skeg 62.

It will be noted that the rear end 50 of the metering beam 46 is raised as the longitudinal plate 60 pivots about the hinge 72 to follow the raising of the front end 48 of metering beam 46.

In its lowered position, metering beam 46 is positioned at the longitudinal output area 30. The longitudinal output area 30 and conveyor 38 are thus covered by the metering beam 46, with the exception of the section below the tapered rear end 50 of the metering beam 46 which remains partially uncovered. In this position, flow of aggregate material to the longitudinal output area 30 and conveyor 38 is limited. As metering beam 46 is elevated from its lowered position to a raised position, the longitudinal output area 30 and conveyor 38 are increasingly uncovered, thus increasing the flow of aggregate material to the longitudinal output area 30 and conveyor 38. Elevation of metering beam 46 also serves to separate aggregate material prone to clumping. In the preferred embodiment of this invention, the metering beam is 19 feet long and the front end 48 of the metering beam 46 may be elevated approximately 40 inches from the longitudinal output area 30. Depending on the type of aggregate material, elevation of 40 inches may not be required for full and complete flow of the aggregate material to the longitudinal output area 30 and conveyor 38.

In operation, with gate 42 closed and the metering beam in its lowered position covering output area 30, aggregate material may be loaded into body 20 at a first location. The truck may then be driven to a second location and unloaded with the rear of conveyor 38 adjacent a second unloading conveyor. Next, the conveyors may be activated, gate 42 may be partially or fully opened, and hydraulic cylinder 100 activated to extend piston 72 in order to partially or fully elevate metering beam 46. As the beam elevates, the vertical vane 80 assists in breaking up any clumping aggregate, and the vane, in conjunction with the downwardly and outwardly diverging sides 52 and 54, deflect aggregate above the beam to assist in ensuring the smooth flow of the aggregate. If it is desired to slow the flow of aggregate, the beam may be partially lowered. This is possible even though there is aggregate below the beam because this aggregate is moving down and out of body 20.

It will be apparent to a person skilled in the art that a dual-acting hydraulic cylinder may also be used in place of the single-acting hydraulic cylinder 100. It will also be apparent to a person skilled in the art that other means of elevating the metering beam 46 are available: for example, a winch attached to the aggregate carrying body and a cable connecting the winch and the metering beam; a drive motor attached to the aggregate carrying body, the drive motor having a drive shaft, a pinion gear at one end of the drive shaft, a rack attached to the metering beam, with the rack engaging the pinion gear; or a single or double-acting hydraulic ram mounted between the metering beam 46 and body 20 are all possibilities. Similarly, it will be apparent to a person skilled in the art that the means for elevating may be positioned at various points along the metering beam 46, or a plurality of means for elevation may be positioned at a plurality of points along metering beam 46. For example, two hydraulic cylinders may be utilized, one positioned at the front end 48 of metering beam 46 and the other at the rear end 50 of metering beam 46.

While it is preferred the output area 30 comprises a conveying floor, it will be apparent to a person skilled in the art that the output area 30 may comprise a longitudinal opening and a conveyor may then be disposed beneath the opening. In this embodiment, the metering beam would preferably not have a tapered end so that, in its lowered position, it completely covers the opening. As well, in this embodiment, the conveyor would preferably have vertical side walls to prevent spillage of the aggregate material. Alternatively, the conveyor could be separately mounted and the truck driven over it prior to elevating the metering beam.

The metering beam 46 may also be utilized in aggregate carrying bodies other than the one described herein and mounted on a truck. For example, it may be used in aggregate carrying bodies found on ships, trains and in buildings.

Furthermore, the metering beam 46 may also be applied to aggregate material other than sand, gravel or top-soil, such as grain, powder or any other solid particulate matter.

Although one embodiment of the invention has been illustrated and described, it is understood that the invention is not limited to the embodiment disclosed, but is capable of numerous rearrangements, modifications, and substitution of parts without departing from the spirit of the invention.

What is claimed:

1. An apparatus for carrying and unloading aggregate material comprising:

an aggregate carrying body defining an output area proximate a bottom of said body;

a metering beam located in said body above said output area, said metering beam having a first end with a skeg, a tapered second end with an extending longitudinal plate, a central vertical vane with a pair of sides extending downwardly and outwardly therefrom; and a means for elevating said metering beam from a first position on said output area for covering said output area, to a second position away from said output area; said means for elevating having an hydraulic cylinder acting between said body and said metering beam, proximate said first end of said metering beam and including a pivotal mount attaching said second end of said metering beam to said body.

2. The apparatus of claim 1 wherein said pivotal mount comprises a hinge.

3. The apparatus of claim 2 wherein said hinge attaches said extending longitudinal plate proximate a top edge of a rear end wall of said body.

4. An apparatus for carrying and unloading aggregate material comprising:

an aggregate carrying body having a front end wall, a rear end wall, and defining an output area at a bottom of said body wherein said output area comprises a conveying floor;

a metering beam located in said body above said output area, said metering beam comprising a first end having a skeg, a tapered second end having an extending longitudinal plate, a pair of downwardly and outwardly extending sides, and a central vertical vane from which said downwardly and outwardly extending sides extend;

means for elevating said metering beam from a first position proximate said output area, to a second position away from said output area;

said means comprising a hydraulic cylinder attached proximate a top edge of said front end wall of said body, said hydraulic cylinder acting on a cable attached at a first end of said cable proximate said first end of said metering beam and at a second end of said cable to said body, and including a hinge attaching said extending longitudinal plate proximate a top edge of said rear end wall of said body.

5. An apparatus for assisting and controlling the flow of aggregate material to an output area which removes the aggregate material from an aggregate carrying body comprising:

a metering beam having a first end with a skeg, a tapered second end with an extending longitudinal plate, and a central vertical vane with a pair of sides extending downwardly and outwardly therefrom; and a means for elevating said metering beam from a first position to a second position, said means for elevating having a hydraulic cylinder proximate said first end of said metering beam and including a pivotal mount attaching said second end of said metering beam to said body, said hydraulic cylinder acting between said body and said metering beam.

6. The apparatus of claim 5 wherein said pivotal mount comprises a hinge.

7. The apparatus of claim 6 wherein said hinge attaches said extending longitudinal plate proximate a top edge of a rear end wall of said body.

* * * * *